UNITED STATES PATENT OFFICE.

NATHANIEL P. PRATT, OF ATLANTA, GEORGIA, ASSIGNOR TO PRATT PROCESS COMPANY, OF ATLANTA, GEORGIA, A CORPORATION OF GEORGIA.

TREATMENT OF PHOSPHATES.

1,014,254.      Specification of Letters Patent.      Patented Jan. 9, 1912.

No Drawing.    Application filed January 27, 1911. Serial No. 604,998.

*To all whom it may concern:*

Be it known that I, NATHANIEL P. PRATT, a citizen of the United States, residing at Atlanta, in the county of Fulton and State of Georgia, have invented certain new and useful Improvements in the Treatment of Phosphates, of which the following is a specification.

My invention relates to the treatment of phosphates.

My invention is predicated, primarily, upon the discovery that certain earthy deposits with which I have become familiar differ substantially from other known phosphate-deposits in at least two respects: First, they are not in the usual form of rock; and, secondly, they include, as shown by analysis, about thirty-four per cent. (34%) of calcium sulfate, approximately, and about sixty per cent. (60%), approximately, of what is commercially known as bone phosphate of lime, the last-mentioned being very sparingly soluble in water. It is the valuable constituent desired for the manufacture of fertilizers; and, in consequence, the primary object of my invention is to separate from it the calcium sulfate and thereby produce a product which is rich in phosphate. By reason of the fact that these particular deposits include practically no impurities—such as clay, sand, etc.—in the sense that such impurities usually exist in other deposits and which have to be taken into consideration in known processes, I am enabled to utilize the process hereafter described with great success. Thereby, I not only am able materially to reduce the cost of production, but the product obtained is exceedingly rich in its inclusion of a desired proportionate amount of calcium phosphate.

As is generally known to those familiar with the art, native phosphates have heretofore been prepared for use by washing with water. By a system of flushing, this water removes the sand and clay. The product of my invention is distinguished from these so-called "washed phosphates," as will readily be understood by those skilled in the art.

I have found, by experiments, that the methods heretofore practiced will not suffice to produce the best results in connection with the native phosphates hereinabove referred to. In the first place, the material is loose, light and earthy, and there are, as already stated, none of the usual impurities, such as sand, clay, etc., present in the deposits; and, in the second place, the main, and practically the only, ingredient therein other than calcium phosphate, is calcium sulfate. It is desirable to remove this from the phosphate because it is not a valuable fertilizer-ingredient. It can not, however, be separated therefrom at all, in suspension in water like sand and clay, but, by experience, I have discovered that it is soluble in fresh water to a slight extent. It is, however, readily soluble in saline solutions, and, particularly, in that class of solutions comprising, or which includes, sea water. I have also discovered that this sea water has little or no practical action on the calcium phosphate present in the mass. In view of the discoveries of these peculiar characteristics of these particular native phosphatic deposits, I propose, as a method of treating the same, to subject said native phosphates to the action of a saline solution, preferably, sea water, either by mixing the same with the material and settling it out, and draining off the water to thereby carry the calcium sulfate in solution; or by percolation through the mass; or, in fact, by any other suitable means of treatment, the object being, always, to dissolve the calcium sulfate out of the mass and leave the phosphate present. The action of the sea water is to dissolve the calcium sulfate out of the phosphatic aggregants, leaving them in porous condition. I have found, by this novel method of solution and drainage, that all of the calcium sulfate can be removed, and with the practical result that, a mass which originally contained only 60% of calcium phosphate is raised to a richness of approximately ninety per cent. (90%). As is generally known, the measure of the value of phosphates for the manufacture of fertilizers is the percentage of phosphates they contain. Hence, the product of my invention is of very great value by reason of its richness therein.

So far as I am aware, no native deposit of phosphates, other than that above-mentioned, has ever been found which contains calcium sulfate in appreciable quantities and, therefore, none in which the calcium sulfate plays such an important part as to make it a desideratum to remove it. Again, I know of no other phosphatic deposit which contains a practically valueless ingredient which is appreciably soluble in water and another ingredient which is valuable and which has the characteristic of not appreciably dissolving in water. Moreover, I am unaware of any other deposit wherein the mass embodies practically no other impurities of the kind already specified. Therefore, it is novel procedure to subject such a mass containing calcium phosphate and calcium sulphate to the dissolving action of water, thereby rendering the latter in solution without practically affecting the phosphates.

By my invention, I am therefore enabled to utilize, with new results, saline solutions, of which sea water furnishes a preferable type, to enrich native phosphates containing sulfates; and this process I claim broadly.

While I have herein described my new method in detail, it is to be understood that I do not limit myself to such details of procedure except insofar as these may be specified in the claims.

Having thus fully described my invention, the procedure followed thereunder, and the results produced, what I claim as new and desire to secure by Letters-Patent of the United States is:

1. The method of enriching native phosphates containing sulfates, which consists in subjecting the same to the solvent action of water to separate the sulfates from the phosphates, and then draining off the water containing the sulfates.

2. The method of treating native phosphates containing sulfates which consists in subjecting the same to the solvent action of a saline solution to separate the sulfates from the phosphates, and then draining off the sulfate-impregnated water.

3. The method of treating native phosphates containing sulfates which consists in subjecting the same to the solvent action of a saline solution including sea water to separate the sulfates from the phosphates, and then draining off the sulfate-impregnated water.

4. The method of treating native phosphates containing calcium sulfate which consists in subjecting the same to the solvent action of water characterized by a sulfate-dissolving action, and draining off from the phosphates the solution produced.

5. The method of treating native phosphates containing sulfates, which consists in subjecting the same to the solvent action of sea water and subsequently draining off from the mass the water containing the sulfates.

6. The herein-described process of enriching a phosphatic mass containing calcium sulfate soluble in water and calcium phosphate insoluble in water, which consists in subjecting said mass to the action of sea water to dissolve the sulfates, and then separating said sulfate-charged water from the phosphates.

7. The herein-described process of enriching a phosphatic mass to aproximately 90% bone phosphate of lime, which consists in subjecting native phosphates containing sulfates to the action of sea water and then separating the sulfate-containing water from the mass.

8. The herein-described process of treating native phosphates which consists in disassociating the calcium sulfate from the calcium phosphate through the medium of sea water to render the sulfate soluble, and then separating the sulfate solution from the phosphates which are insoluble in said water.

9. The method of treating native phosphates containing sulfates, which consists in separating the sulfates from the phosphates.

10. The method of treating native phosphates containing sulfates, which consists in separating the sulfates from the phosphates, separating the sulfates from the phosphates, separating being effected by subjecting said separation being effected by subjecting the same to the solvent action of water and, then, draining off the sulfate-impregnated water.

11. The method of treating native phosphates containing sulfates, which consists in separating the sulfates from the phosphates, such separation being effected by subjecting the same to the solvent action of sea water and subsequently draining off from the mass the water containing the sulfate.

In testimony whereof I have affixed my signature in presence of two witnesses.

NATHANIEL P. PRATT.

Witnesses:
C. H. BROTHERTON,
P. G. KEENEY.